Feb. 10, 1970  E. C. MONTGOMERY  3,494,755
METHOD AND APPARATUS FOR PRODUCING FLOAT GLASS
UTILIZING A CONDENSING SURFACE

Filed Oct. 30, 1967  2 Sheets-Sheet 1

INVENTOR.
Edwin C. Montgomery
BY
Collins & Oberlin
ATTORNEYS

United States Patent Office 3,494,755
Patented Feb. 10, 1970

3,494,755
METHOD AND APPARATUS FOR PRODUCING FLOAT GLASS UTILIZING A CONDENSING SURFACE
Eldwin C. Montgomery, Modesto, Calif., assignor to Libbey-Owens-Ford Glass Company, Toledo, Ohio, a corporation of Ohio
Filed Oct. 30, 1967, Ser. No. 678,954
Int. Cl. C03b 18/02
U.S. Cl. 65—27                             7 Claims

ABSTRACT OF THE DISCLOSURE

A plenum chamber, for confining the float atmosphere above the molten metal bath in a float glass forming apparatus, is provided with a collecting surface in said chamber for condensing metal evaporating from the exposed portions of the metal bath and diverting or directing the same, as it agglomerates, away from the glass ribbon advancing over the bath and into position to drip directly back into exposed areas of the bath. The collecting surface may be formed on a muffle or sub ceiling mounted within the plenum chamber and shaped generally convex in the direction of said bath to receive metal dripping from the ceiling of the chamber and to direct, baffle or limit its movement.

BACKGROUND OF THE INVENTION

Field of the invention

The present invention relates broadly to the manufacture of float glass and more particularly to a method and apparatus for preventing defects in the finished glass resulting from metal dripping from the ceiling of the plenum chamber onto the float glass ribbon.

Description of the prior art

While the production of float glass, as a commercial product, is relatively new it is already being manufactured by some of the major glass companies, and a conventional form of float glass forming apparatus is illustrated and described in U.S. Patent No. 3,083,551, granted Apr. 2, 1963. As there explained, the manufacture of flat glass by the float process involves delivering glass at a controlled rate onto a relatively wide bath of molten metal (usually tin) and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as its advances to permit it to be taken unharmed out of the bath by mechanical conveying means. Above the float bath of molten metal a tightly enclosed head space or plenum chamber is provided to contain the so-called float atmosphere.

Since one of the advantages of float glass is that it is formed with the desired surface finish, and so need not be ground and polished, successful commercial operation of the float process requires that no foreign matter of any kind be permitted to adhere to or accumulate on the upper or exposed surface of the float glass ribbon.

However, as theretofore practiced, considerable difficulty has been experienced from so-called "tin drops" which fall or drip from the ceiling of the plenum chamber onto the surface of the hot glass ribbon and which have resulted in actual production losses as high as 40% in some instances.

SUMMARY

It has now been determined that such metal drop defects result from evaporation of molten metal from the areas of the float bath that are exposed to the float atmosphere at either side of the glass ribbon moving thereover and which condenses or deposits in the pore spaces of the refractory surfaces inside the plenum chamber. After a time the metal concentration on the ceiling of the chamber becomes heavy enough to agglomerate and fall or drip from the ceiling onto the glass ribbon.

According to this invention the dripping of metal onto the float glass ribbon is avoided by receiving or collecting the evaporating metal on a surface of a character and that is shaped to divert and guide the metal as it agglomerates away from the area of the plenum chamber that is over the glass ribbon and direct it toward a location where it will drip back into the portion of the molten metal of the bath that is at the sides of and spaced from the glass ribbon.

It is, therefore, a primary object of the invention to prevent the dripping of metal from the refractory ceiling of the plenum chamber onto the glass ribbon moving therethrough.

Another object is to collect metal evaporated from the float bath and to return it directly to the bath.

Still another object is to prevent any metal that may drip from the ceiling of the plenum chamber from falling on the glass ribbon therein.

Briefly stated, these and other objects of the invention are accomplished by providing, within the plenum chamber, a collecting surface for metal evaporting from the float bath, and which may be part of a baffle or sub ceiling that is shaped to divert the condensed metal as it agglomerates toward and beyond the side edges of the float ribbon.

Further objects and advantages will become apparent during the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENTS

Figure 1:
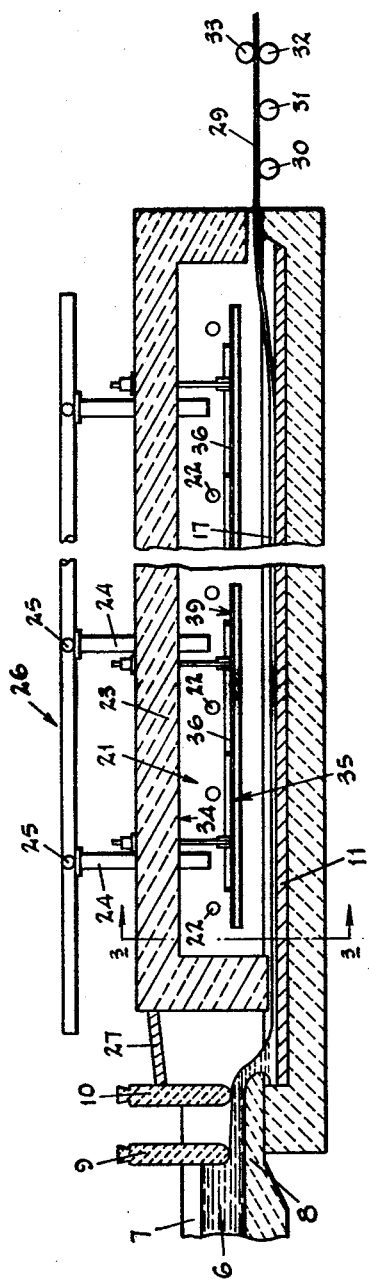
FIG. 1 is a longitudinal, vertical, sectional view through a representative type of float glass forming apparatus in which the plenum chamber is provided with a collecting surface in accordance with the invention.
Figure 2:
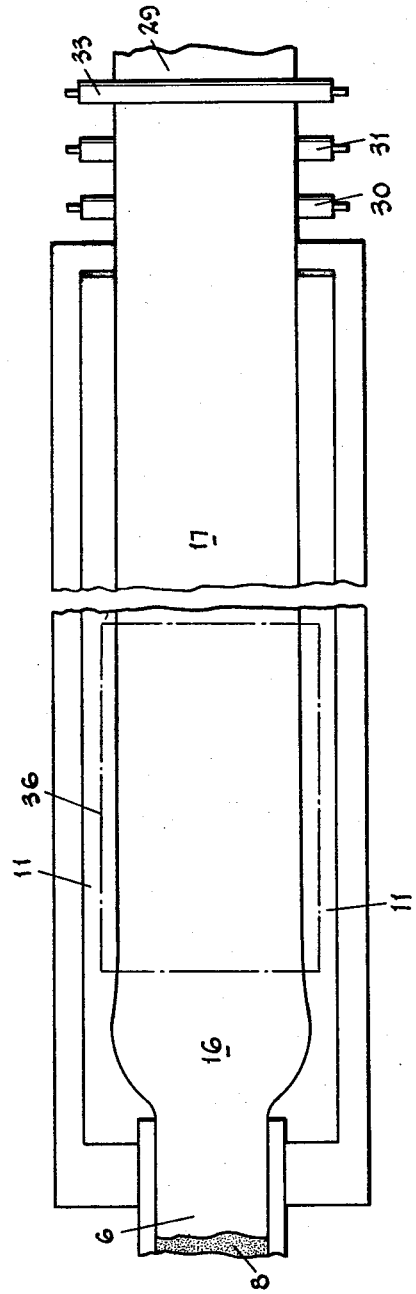
FIG. 2 is a plan view of the apparatus of FIG. 1 with the plenum chamber removed.

Referring now more particularly to the drawings there is illustrated in FIGS. 1 and 2 a typical float glass machine similar to the one disclosed in U.S. Patent 3,083,551. In this apparatus molten glass 6 is supplied from a forehearth 7 to a spout lip 8 in an amount regulated and controlled by a tweel 9 and a gate 10.

The glass flowing from the spout 8 onto the relatively wide metal bath 11 forms a buoyant molten body indicated at 16 and a buoyant layer of stable thickness 17 develops therefrom.

The metal bath in the tank structure, and the headspace 21 over the bath, are heated by radiant heat directed downwardly from heaters 22 and this headspace 21, which contains the "float atmosphere," is enclosed by a roof structure or plenum chamber 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with the bath metal to produce contaminants of the glass (for example, a mixture of nitrogen and hydrogen) and, by providing a plenum ingress to the headspace 21, entrance of atmospheric air is theoretically prevented.

When the ultimate ribbon 29 is to be of substantially the same thickness are the equilibrium or stable thickness of the glass the temperature of the glass in the buoyant layer or ribbon 17 must be carefully controlled so as to progressively cool it from the tweel 9 to the discharge end of the apparatus by which time the ribbon surface should reach a temperature at which it is sufficiently stiffened to allow its transfer to a lehr on mechanical conveying means without detriment to the surfaces, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet and sufficient to advance it along the bath.

When a ribbon of less than equilibrium thickness is desired, this can be obtained by increasing the speed of the rolls 30 to 33 and thereby modifying their tractional effort and attenuating the molten glass body 17 of stable thickness.

As indicated above, float glass forming apparatus of this character have heretofore produced glass ribbons having droplets of metal on and/or embedded in their upper surfaces, creating defects that result in the rejection of sizeable areas of the ribbon for commercial use; and such defects, caused by evaporated and agglomerated metal dripping from the ceiling 34 of the plenum chamber onto the glass ribbon, resulted in seriously high if not prohibitive production losses.

Figure 3:
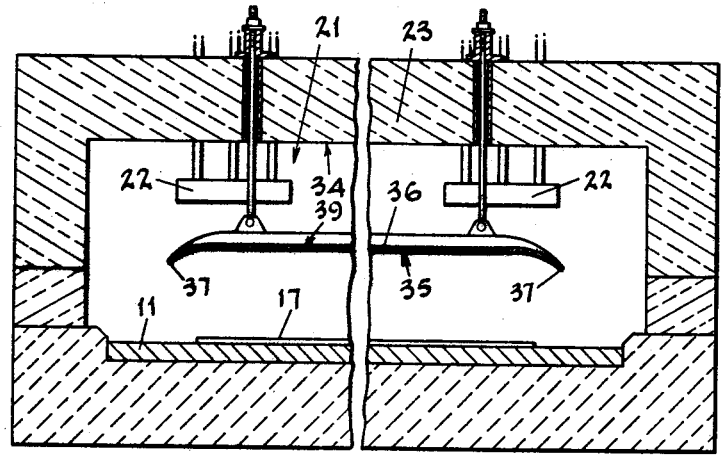
FIG. 3 is a transverse, vertical section taken substantially along the line 3—3 of FIG. 1.

According to the present invention, however, these metal drop defects can now be avoided by the provision of a suitable collecting surface or surfaces within the plenum chamber. For example, as indicated at 35 in FIGS. 1 and 3. As there shown the collecting surface 35 is the lower surface of a collecting member which may be a baffle or sub ceiling 36 mounted above and covering the width of the glass ribbon on the bath 11, although, it may, as well, be formed on or incorporated into the ceiling 34 itself.

The collecting member should be of a material that will resist the relatively high temperatures in the float atmosphere and the collecting surface should be such that evaporated metal condensing and agglomerating thereon can move freely thereover while being retained in contact with the surface by capillary attraction. For example, both metals and alloys having the desired properties can be employed and, as a specific example, the commercially available material known as "Kanthal" is very well suited for the purpose.

A further requirement is that the collecting body and surface be shaped to divert and direct the evaporated metal, as it collects or condenses and agglomerates thereon, laterally away from the area directly over the float glass ribbon and to then permit it to drip back into the bath 11 at either side of the ribbon and preferably at the outer edges of the bath.

Thus a shaping surface, such as shown at 35 (FIG. 3), that is generally convex across its width and toward the bath, and is on the similarly shaped member 36 that is thinned down toward its lateral edges as at 37, will function very effectively. By also employing a sufficiently thin and conductive plate as the collecting body 36, it may be mounted as a muffle below the heating elements 22 in the plenum chamber 23. However, if necessary or desirable, the collecting member 36 can be mounted as a sub ceiling with the heating elements located therebeneath.

It will be noted that the member 36 will also act to protect the glass ribbon from any evaporated metal that may still condense on and drip from the ceiling 34 and that such metal will be collected on the upper surface 39 of the collecting member where it will ultimately also be directed toward and finally drip into the exposed edge portions of the bath 11 from the thinned edges 37.

Figure 4:
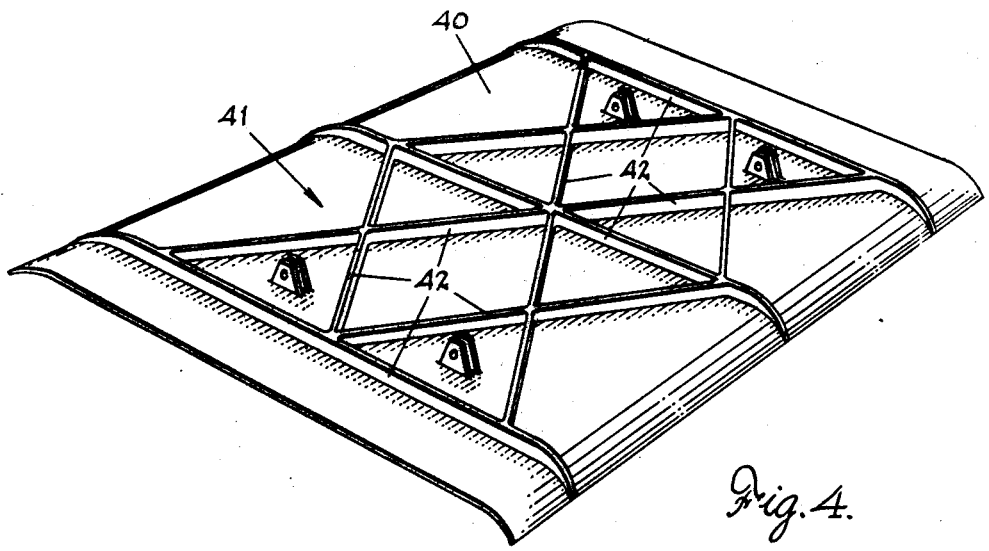
FIG. 4 is a perspective view of a modified form of sub ceiling for the plenum chamber and which is provided with upper and lower collecting surfaces.

The form of collecting member shown at 36 is one that can also be incorporated into or be employed as the actual ceiling of the plenum chamber 23, but a somewhat modified form shown at 40 in FIG. 4 is designed primarily for use as a baffle or sub ceiling.

Thus, while the member 40 is of the same general shape as the member 36, its upper surface 41 is provided with a plurality of ribs or raised portions 42 which may be in any desired pattern calculated to collect and retain metal dripping onto it from the ceiling 34 of the plenum chamber and/or divert and channel the same along a desired path or paths toward the outer edges thereof.

It is contemplated that the collecting members and/or surfaces of the invention can be employed in and along the length of the plenum chamber 23 in sizes and in a number sufficient to cover the entire glass ribbon, including the buoyant body 16 and the layer 17 of stable thickness, moving within the plenum chamber. On the other hand, they may be confined to or used only in the areas of the chamber where the metal drop problem has existed or where it has been most severe.

I claim:

1. In a method of producing float glass in which a ribbon of glass is floated on and advanced over a bath of molten metal of greater width than said ribbon in a float chamber containing a confined atmosphere, the improvement comprising preventing dripping of metal evaporated from said bath onto said ribbon by condensing said metal on a surface in said float chamber as it evaporates, while directing the metal as it condenses on said surface laterally away from the area directly over said ribbon, and returning it directly to said bath.

2. A method as defined in claim 1 which also includes the step of collecting any of said evaporated metal that condenses on and drips from the ceiling of said chamber before it reaches said ribbon.

3. In apparatus for forming float glass including a tank containing a bath of molten metal upon which a glass ribbon of lesser width than said bath is floated and advanced and a float chamber located over said bath and confining a float atmosphere thereabove, the improvement comprising a member having a surface upon which metal evaporating from said bath condenses, located in said chamber above said bath, said surface being positioned and shaped generally convex in the direction of said bath to direct said evaporated metal as it agglomerates laterally away from the area directly above said ribbon and into position to drip back into said bath beyond an edge of said ribbon.

4. Apparatus as defined in claim 3 in which said member is a plate thinned at an edge to facilitate dripping of said metal into said bath.

5. Apparatus as defined in claim 3 in which said member is a plate spaced from the ceiling of said chamber and thinned at its side edges to facilitate dripping of said metal onto said bath, and said surface is the lower surface of said plate and is convex in the direction of said bath.

6. Apparatus as defined in claim 3 in which said member is a plate, spaced from the ceiling of said chamber and is provided with upper and lower shaped collecting surfaces.

7. Apparatus as defined in claim 6 in which said upper collecting surface is provided with raised portions for channeling molten metal on said surface.

References Cited

UNITED STATES PATENTS 3,356,476  12/1967  Gulotta _____ 65—182 X

S. LEON BASHORE, Primary Examiner

E. R. FREEDMAN, Assistant Examiner

U.S. Cl. X.R.

65—65, 99, 168, 182